July 31, 1923.  
K. OTSUKI  
STORING AND PRESERVING CABINET  
Filed April 7, 1922

1,463,723

Inventor.  
K. Otsuki  
Victor J. Evans  
By Attorney

Patented July 31, 1923.

1,463,723

UNITED STATES PATENT OFFICE.

KISABURO OTSUKI, OF FULTON, CALIFORNIA.

STORING AND PRESERVING CABINET.

Application filed April 7, 1922. Serial No. 550,527.

*To all whom it may concern:*

Be it known that I, KISABURO OTSUKI, a subject of the Emperor of Japan, residing at Fulton, in the county of Sonoma and State of California, have invented new and useful Improvements in Storing and Preserving Cabinets, of which the following is a specification.

This invention relates to improvements in storing and preserving cabinets and receptacles.

The principal object of this invention is to produce a receptacle in which fruit, meat and other foodstuffs may be placed and kept at a shipping point, or this receptacle may be made of such a size that it may be easily transported.

Another object of this invention is to produce a device of this character which is simple in construction and one which may be easily cleaned.

Another object is to produce a device of this character which may be employed in private residences and other points where food is to be kept prior to consumption.

A further object is to produce a simple means for maintaining a vacuum in either the receptacle or in the walls thereof.

Other objects and advantages will be apparent during the course of the following description.

In the accompanying drawings forming a part of this specification and in which like numerals are employed to designate like parts throughout the same, Figure 1 is a cross-section taken on the line 1—1 of Figure 2, Figure 2 is a horizontal cross-section taken on the line 2—2 of Figure 1.

It is a well known fact that in localities where the heat is excessive or owing to certain climatic conditions, fruit spoils rapidly and cannot be transported any appreciable distance after it becomes ripe and it is to provide a receptacle for keeping and shipping fruit of this character that I have devised my invention.

Figure 1:
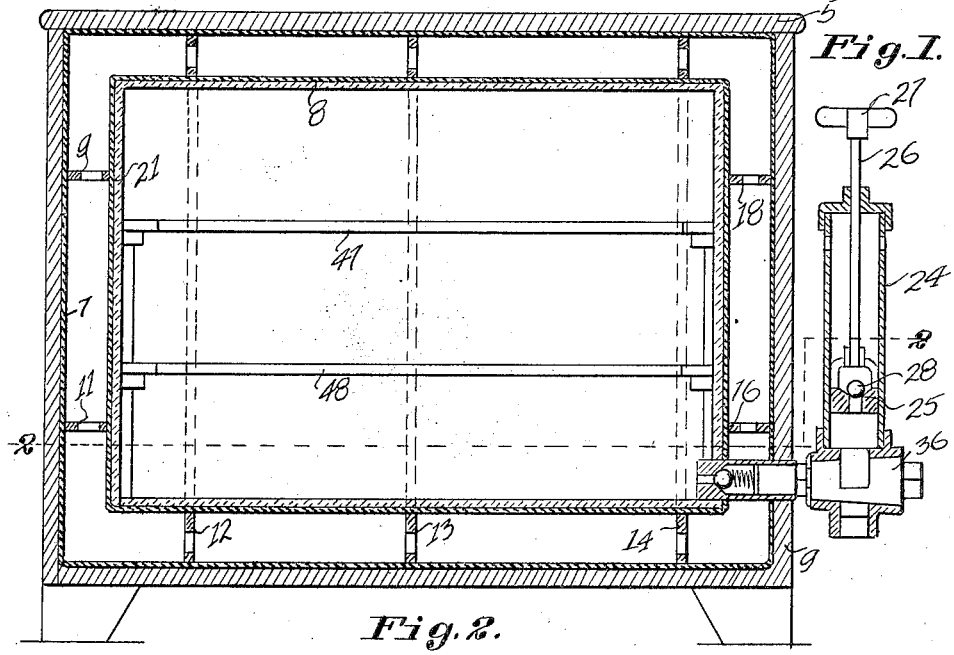
Figure 2:
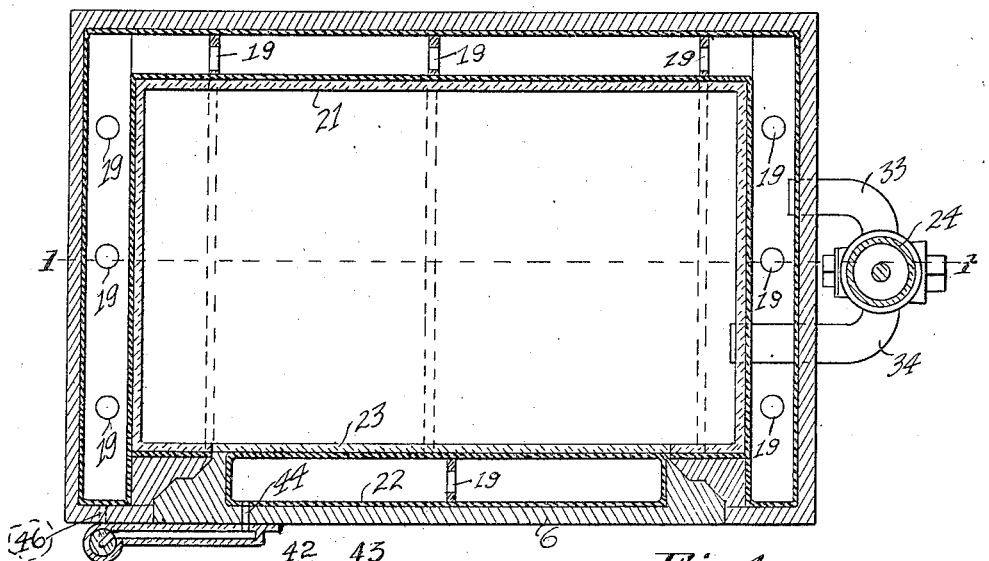
Figures 3, 4:
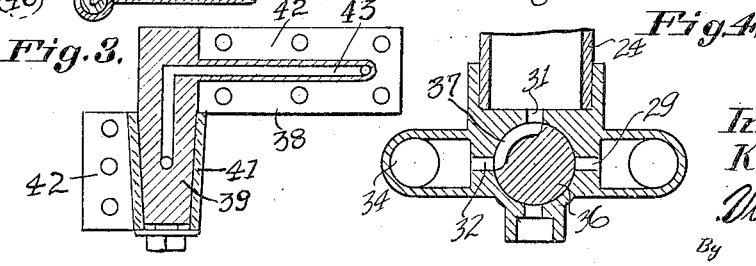
Figure 3 is an enlarged fragmentary detail view of the hinged mechanism.
Figure 4 is an enlarged detail view of a valve mechanism.

In the accompanying drawings wherein for the purpose of illustration is shown a preferred embodiment of my invention, the numeral 5 designates a receptacle closed on all sides and provided with a door 6. This receptacle may be built up or may be cast as desired. The numeral 7 designates a lining for the receptacle which is preferably made of metal or other impervious material. A similar receptacle 8, made of metal or similar impervious material, is mounted within the first mentioned receptacle and is spaced therefrom as by spacers 9, 11, 12, 13, 14, 16 and 18. These spacers are provided with openings 19 therethrough for the purpose of allowing circulation within the interior spaced about the inner receptacle, which is preferably made of glass. This inner receptacle is also provided with an opening which is also adapted to be closed by the door 6. This door is hollow as best shown in Figure 2 where it will be noted that the hollow space is lined with an impervious material 22, and carries a glass inner face 23. The space between the receptacles is adapted to be exhausted of air, so as to produce a partial vacuum therein. This is accomplished through the medium of a pump comprising a cylinder 24 and a piston 25. The piston 25 is movable through the medium of a rod 26 provided with a handle 27. The usual valve 28 is provided in the piston. This pump is secured to a three way valve, the construction of which is best shown in Figure 4 where it will be noted that passages 29, 31 and 32 are provided, the passage 31 extending from the pump cylinder to the valve chamber, and the passage 29 extending from the valve chamber to the pipe 33. This pipe in turn enters the space between the two receptacles, and the passage 32 extends from the valve chamber to the pipe 34, which pipe extends from the valve to the interior of the inner receptacles. A valve 36 is positioned within the valve chamber and is provided with a passage 37, which passage when rotated is adapted to connect the passage from the pump chamber to either of the passages 29 or 32. The door 6 is hinged to the receptacle as by a hinge comprising a plate 38 having a downwardly depending tapered valve portion 39, which is adapted to engage a valve seat 41 mounted upon a plate 42. The passage 43 is adapted to conduct a vacuum from the port 44 formed in the door 6 to the port 46 formed in the receptacle. Shelves may be placed in the inner receptacle as shown at 47 and 48.

The structure thus described is preferably employed in the storing of fruit as the receptacles used for transportation are formed entirely of metal and consequently of a much lighter construction.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. In a receptacle of the character described, the combination with an outer receptacle, of an inner receptacle, a door adapted to close said inner receptacle, means for spacing said receptacles one from the other, and means for producing a vacuum between said receptacles and within the interior of said inner receptacle.

2. In a receptacle of the character described, the combination with an outer receptacle, of an inner receptacle, a hinged door adapted to give access to said inner receptacle, a vacuum space formed between said receptacles, means for producing a vacuum between said receptacles and within the inner of said receptacles, and means for maintaining said receptacles in spaced relation one to the other.

3. In a device of the character described, the combination with a receptacle having an impervious lining, an impervious receptacle mounted within said first mentioned receptacle and spaced therefrom, a door adapted to give access to said second mentioned receptacle, a space formed within said door, an impervious lining formed within said space, a pump secured on said first mentioned receptacle and adapted to communicate with the space therebetween, for the purpose of exhausting air therefrom and from the interior of said receptacle, and communicating means for causing a vacuum to be formed in said space in said door.

In testimony whereof I affix my signature.

KISABURO OTSUKI.